July 9, 1963
C. L. WANLASS
3,097,305
GATING CIRCUIT
Filed Jan. 12, 1959
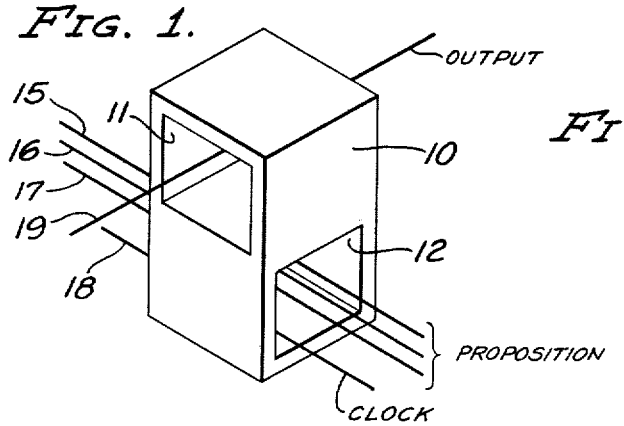
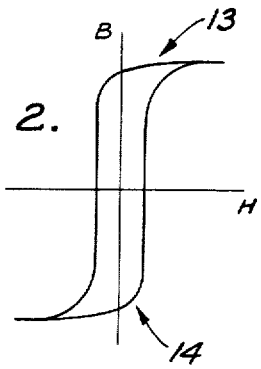
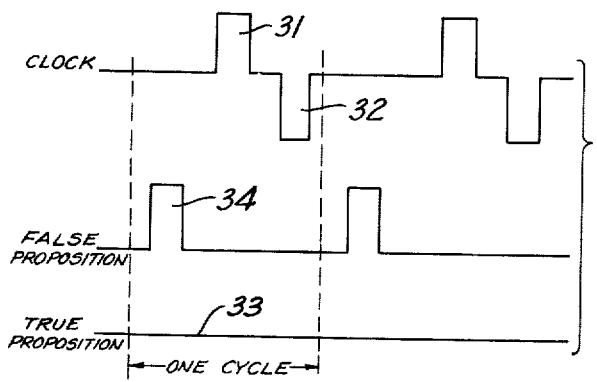
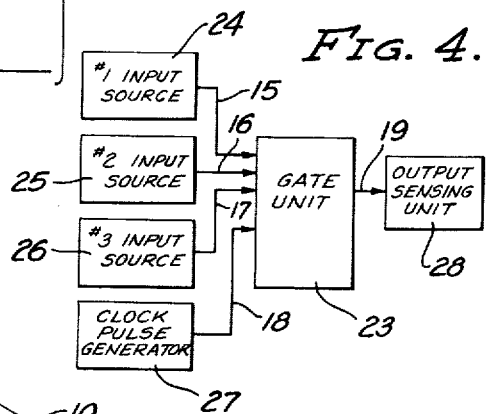
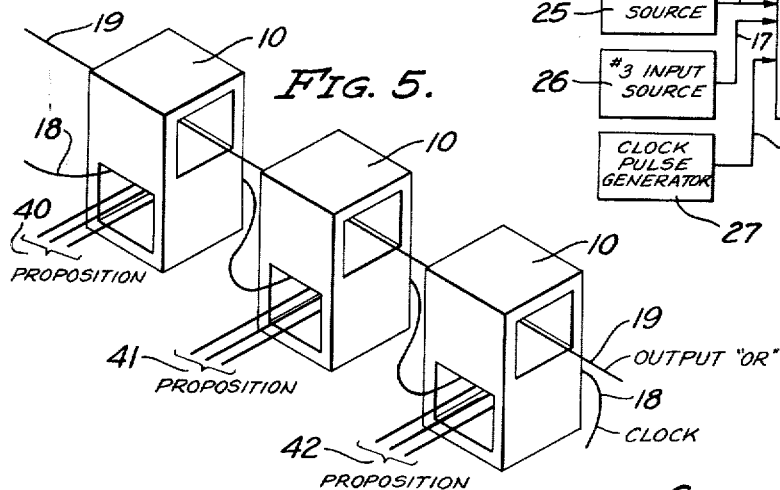
INVENTOR
CRAVENS L. WANLASS
BY HIS ATTORNEYS
HARRIS, KIECH, FOSTER & HARRIS

United States Patent Office 3,097,305
Patented July 9, 1963

3,097,305
GATING CIRCUIT
Cravens L. Wanlass, Woodland Hills, Calif., assignor, by mesne assignments, to Ford Motor Company, Dearborn, Mich., a corporation of Delaware
Filed Jan. 12, 1959, Ser. No. 786,429
3 Claims. (Cl. 307—88)

This invention relates to gating circuits suitable for use in instrumenting logic systems and, in particular, to gating circuits utilizing orthogonal magnetic fields.

My copending application entitled "Logic System Gating Circuit," Serial No. 689,622, filed October 11, 1957, now U.S. Patent No. 3,060,410, describes a gating circuit utilizing a plurality of proposition or input conductors, a sense or clock conductor, a read or output conductor, and a bias conductor. It has now been found that gating circuits utilizing orthogonal magnetic fields can be produced without requiring a bias current or bias flux and it is an object of the present invention to provide an orthogonal field gating circuit having no bias conductor or other means for producing a bias flux. It is a further object of the invention to provide such a gating circuit which employs magnetic material having a substantially square hysteresis loop. The term "substantially square hysteresis loop" is used herein in its generally accepted sense, i.e., the major loop crosses the H axis at substantially right angles so that the material has only two possible flux states, namely positive and negative saturation.

It is a further object of the invention to provide an orthogonal field gating circuit which may be used either as an and gate or as an or gate. Another object is to provide such a gating circuit in which a number of and-type gates may be connected in series to provide an or-type gate.

It is an object of the invention to provide a gating circuit including a block of magnetic material having a substantially square hysteresis loop, a plurality of proposition conductors passing through the block parallel to each other, a clock conductor passing through the block parallel to the proposition conductors, and an output conductor passing through the block perpendicular to the proposition conductors. A further object of the invention is to provide such a gating circuit having a clock pulse generator connected to the clock conductor for producing a current pulse in the clock conductor of one polarity for sensing the saturation state of the magnetic material and subsequently producing a current pulse of the opposite polarity for setting the magnetic material to a particular saturation state. A further object is to provide such a gating circuit wherein the sensing function and the setting function of the clock pulses can be combined in a single clock pulse. Another object of the invention is to provide such a gating circuit including an output conductor sensing unit which can be activated to detect currents in the output conductor due to flux changes in the material during the sensing clock current pulse and be deactivated during the remainder of the gating cycle.

It is an object of the invention to provide a gating circuit which can be interconnected with a plurality of other gating circuits in the same manner as the circuits of my aforesaid copending application. A further object of the invention is to provide a gating circuit which can be manufactured in the same form and manner as the gating circuits of my aforesaid copending application.

It is an object of the invention to provide an orthogonal field gating circuit which is small, durable, dependable and simple to manufacture. A further object is to provide such a gating circuit which will have a high operating speed while requiring low operating currents and which will have a long operating life.

Other objects, advantages, features and results of the invention will more fully appear in the course of the following description. The drawing merely shows and the description merely describes a preferred embodiment which is given by way of illustration or example.

In the drawing:

FIG. 1 is an isometric view of a preferred form of the invention;

FIG. 2 is a graph showing a square hysteresis loop;

FIG. 3 is a graph showing the relation of the various pulses applied to the gating circuit when used as an and gate;

FIG. 4 is a block diagram of a circuit employing the invention; and

FIG. 5 is an isometric view of a plurality of the units of FIG. 1 connected as an or gate.

In the description of the gating circuit of the invention to follow, the terms "true" and "false" are used in their conventional logic sense. When all of the input propositions to an and gate are true, the output of the gate will be true. If one or more of the input propositions are false, the output of the and gate will be false. When one or more of the input propositions to an or gate are true, the output of the gate will be true. When all of the input propositions to the or gate are false, the output will be false.

Referring now to FIG. 1, a block 10 of magnetic material is provided with openings 11, 12 which pass therethrough perpendicular to each other. The openings 11 and 12 are separated by a quantity of magnetic material to define a flux zone therebetween. The magnetic material should have a substantially square hysteresis loop, such as that shown in FIG. 2, so that the material will always be in one of the two flux saturation states indicated at 13 and 14 even in the absence of any magnetizing current.

A plurality of conductors are passed through the block with one of the conductors perpendicular to the others. In the unit of FIG. 1, proposition or input conductors 15, 16, 17 and a clock or sense conductor 18 are positioned in the opening 12 and an output or read conductor 19 is positioned in the opening 11. Any number of proposition conductors may be utilized, the particular number for each unit depending upon the particular logical expression being handled.

The diagram of FIG. 4 indicates how the gating circuit of the invention is operated in a logical system. A gate unit 23 such as is shown in FIG. 1 has input sources 24, 25 and 26 connected to the proposition conductors 15, 16 and 17, respectively, a clock pulse generator 27 connected to the clock conductor 18, and an output sensing unit 28 connected to the output conductor 19.

In the operation of the gating circuit of the invention, the magnetic material in the flux path around the output conductor 19 is set into one of the saturation states which, for the purposes of this discussion, will be considered the positive saturation state as indicated at 13 in FIG. 2. The magnetic material in the flux path around the output conductor will remain in this saturation state throughout the operation of the gating circuit. FIG. 3 shows the pulse timing diagram for operation of the gating circuit as an and gate. The clock pulse generator 27 provides a first or sensing current pulse 31 to the clock conductor 18, followed by a second or set current pulse 32. The first current pulse 31 is of a polartiy to change the flux state of the magnetic material in the flux path around the clock and proposition conductors to one saturation state, for example, the positive saturation state 13, while the second pulse is of the opposite polarity to change the state to the opposite saturation condition 14.

Therefore, at the beginning of a cycle of operation of the gating circuit, the magnetic material in the flux path around the proposition axis is in a predetermined saturation state, for this example, the negative saturation state. A true input requires no current to the corresponding proposition conductor, as shown by the line 33 of FIG. 3. A false input requires a current pulse 34 of a polarity to change the state of the magnetic material in the flux path around the proposition axis from the negative to the positive saturation state, i.e., from 14 to 13. Hence, one or more false input propositions will produce the same change in state that the first clock pulse 31 produces, but earlier in time. Therefore, when the output of the and gate is false, there will be no change in state of the magnetic material in the flux path around the proposition axis during the clock pulse 31. Conversely, if the output is true, there will be a change in state during the clock pulse 31.

Due to the orthogonal relationship between the proposition and clock conductors and the output conductor, a change in saturation state of the magnetic material in the path around the proposition conductors will produce a current pulse on the output conductor. However, current pulses on the proposition and clock conductors which do not produce a change in state will generate zero or only a very little output on the output conductor 19. Hence, in the operation of the gating circuit, the output sensing unit 28 is activated only during the existence of the clock pulse 31 so that changes in state produced by the proposition pulses, such as the pulse 34, and the clock set pulse 32, will not produce outputs from the gating circuit.

As there is no coupling or conventional transformer action between the output conductor and the proposition and clock conductors, the relative polarities of the saturation states in the paths around the clock and output axes are not pertinent. It is the change in polarity of saturation in the path around the clock axis that produces the interactions with the flux in the path around the output axis in the zone where the paths intersect and, hence, the output signal.

Referring again to the pulse diagram of FIG. 3, at the conclusion of the previous clock pulse cycle, the material in the path around the proposition axes is in the state of point 14 due to the clock set pulse 32. A positive pulse 34, indicating a false proposition, changes the operating point of the material from 14 to 13 where ti remains following the pulse 34. This change in state does not affect the output of the gating circuit, since the output sensing unit is not activated at this time. Then when the clock sense pulse 31 occurs, essentially zero output will be observed on the output conductor 19 since the clock sense pulse produces no change in saturation condition of the material along in the path around the proposition axis. Then the clock set pulse 32 returns the material to the state 14 and the circuit is ready for another gating cycle.

If all of the inputs are true during a gating cycle, there will be no current pulses on the proposition conductors and the material will be switched from state 14 to state 13 by the clock sense pulse 31 causing an output on the output conductor 19 during the time that the sensing unit 28 is activated.

The same circuit can be used as an or gate in the following manner. In the or gate, a current pulse on a proposition conductor will represent a true proposition while an output on the output conductor 19 will represent a false output. Then if any one of the input propositions is true, the material will be switched by the true pulse and the clock sense pulse will not produce a change in state, resulting in zero output or a true output. Conversely, if all the input propositions are false, the clock sense pulse 31 will produce a change in state and a corresponding output pulse which is treated as a false output.

The gating circuit of the invention also may be used as an or gate producing an output on the output conductor 19 for a true output, which is usually the preferred type of output indication. In this application of the invention, a current pulse on a proposition conductor will represent a true proposition as in the previously described or gate. However, the first or sensing current clock pulse 31 is omitted and the second or set current clock pulse 32 functions both as a sensing pulse and a set pulse.

In the operation of this or gate, at the start of a cycle the material in the path around the proposition axis will have been set to one saturation state by the previous clock pulse 32. If no true proposition pulses occur, there will be no intervening change of state and the next clock pulse 32 will produce no change and, hence, nothing on the output conductor for a false indication. However, if there are one or more true proposition pulses, the true pulse will produce a change to the opposite polarity saturation state. Then the next clock pulse will also produce a change in saturation state and an output on the output conductor for a true indication.

The invention also may be operated with a single clock pulse as an and gate. Then a pulse on a proposition conductor indicates a false input proposition as in the diagram of FIG. 3. One or more false inputs provide a change in saturation state so that the next clock pulse also produces a change in state and an output pulse, for a false output indication. When there are no input pulses following a clock pulse, there will be no change in state at the next clock pulse and, hence, no output, for a true output indication.

A different type of or gate having a pulse for the true output indication is shown in FIG. 5. A plurality of the units of FIG. 1 are connected with their clock conductors 18 and their output conductors 19 in series. Each unit is operated as an and gate in the same manner as the unit of FIG. 1 with groups 40, 41, 42 of one or more proposition conductors in each unit. Then a change in state or a true output indication from any one of the units during the period of the clock sensing pulse 31 will produce a pulse or true indication for the output of the over-all circuit.

It should be noted that the gating circuit of the present invention can be assembled and operated in conjunction with a plurality of similar gating circuits in the same manner as the gating circuits in my aforementioned copending application Serial No. 689,622. Also, the gating circuit of the present invention can be manufactured in the same form and in the same manner as the gating circuits of the aforesaid application. While exemplary embodiments of the invention have been disclosed and discussed, it will be understood that other applications of the invention are possible and that the embodiments disclosed may be subjected to various changes, modifications and substitutions without necessarily departing from the spirit of the invention.

I claim as my invention:

1. In a gating circuit, the combination of: a unitary block of homogeneous magnetic material having a first and second state of the magnetic flux and high flux retentivity, the block having a proposition current opening and an output current opening therethrough substantially perpendicular to each other and spaced by a quantity of the magnetic material to provide a flux zone therebetween, and including a first flux path in the magnetic material about the proposition opening and a second flux path in the magnetic material about the output opening intersecting and perpendicular to the first flux path in said flux zone; a plurality of proposition conductors positioned in and extending through said proposition opening; means for coupling current pulses to said proposition conductors for changing the saturation state in the first flux path from the second to the first state; a clock conductor positioned in and extending through said proposition opening; means for coupling current pulses to said clock conductor for changing the saturation state in the first flux path to said second state; and an output conductor positioned in and extending through said output opening for detecting any chages in the magnetic flux in the second flux path about the output opening due to the clock conductor current pulses and producing unipolar output pulses of a polarity which is a function of the saturation state in said second flux path and independent of the polarity of the current pulses on said proposition and clock conductors.

2. In a gating circuit, the combination of: a unitary block of homogeneous magnetic material having a first and a second state of the magnetic flux and high flux retentivity, the block having a proposition current opening and an output current opening therethrough substantially perpendicular to each other with and spaced by a quantity of the magnetic material to provide a flux zone therebetween, and including a first flux path in the magnetic material about the proposition opening and a second flux path in the magnetic material about the output opening intersecting and perpendicular to the first flux path in said flux zone; a plurality of proposition conductors positioned in and extending through said proposition opening; means for coupling current pulses to said proposition conductors for changing the saturation state in the first flux path from the second to the first state; a clock conductor positioned in and extending through said proposition opening; means for cyclically applying to said clock conductor two current pulses of opposite polarity in sequence for changing the saturation state in the first flux path to said first state and then to said second state; and an output conductor positioned in and extending through said output opening for detecting any changes in the magnetic flux in the second flux path about the output opening during the first of said two clock current pulses and producing unipolar output pulses of a polarity which is a function of the saturation state in said second flux path and independent of the polarity of the current pulses on said proposition and clock conductors.

3. In a gating circuit, the combination of: a plurality of unitary blocks of homogeneous magnetic material, each block having a first and a second saturation state of the magnetic flux and high flux retentivity, each block having a proposition current opening and an output current opening therethrough substantially perpendicular to each other and spaced by a quantity of the magnetic material to provide a flux zone therebetween, each block including a first flux path in the magnetic material about the proposition opening and a second flux path in the magnetic material about the output opening intersecting and perpendicular to the first flux path in said flux zone; a plurality of proposition conductors, with at least one proposition conductor positioned in and extending through each proposition opening; means for coupling current pulses to said proposition conductors for changing the saturation states in the corresponding first flux paths from the second to the first state; a clock conductor positioned in and extending through the proposition opening of each of said blocks; means for coupling current pulses to said clock conductor for changing the saturation state in each of the first flux paths to said second state; and an output conductor positioned in and extending through said output opening of each of said blocks for detecting any changes in the magnetic flux in the second flux paths of said blocks due to the clock conductor current pulses.

References Cited in the file of this patent

UNITED STATES PATENTS

| | | |
|---|---|---|
| 2,696,347 | Lo | Dec. 7, 1954 |
| 2,802,953 | Arsenault | Aug. 13, 1957 |
| 2,810,901 | Crane | Oct. 22, 1957 |
| 2,811,652 | Lipkin | Oct. 29, 1957 |
| 2,811,710 | Demer | Oct. 29, 1957 |
| 2,896,194 | Crane | July 21, 1959 |
| 2,905,834 | Arsenault | Sept. 22, 1959 |
| 2,962,719 | Rajchman | Nov. 29, 1960 |
| 2,985,768 | Bobeck | May 23, 1961 |

OTHER REFERENCES

Publication I, "Nondestructive Sensing of Magnetic Cores."

Buck et al.: Communications and Electronics, January 1954, pages 822–830, Fig. 21 relied on, copy in Div. 42, #31.

UNITED STATES PATENT OFFICE
CERTIFICATE OF CORRECTION

Patent No. 3,097,305                                  July 9, 1963

Cravens L. Wanlass

It is hereby certified that error appears in the above numbered patent requiring correction and that the said Letters Patent should read as corrected below.

Column 3, line 43, for "ti" read -- it --; line 50, after "material" strike out "along"; column 4, line 74, for "chages" read -- changes --; column 5, line 10, after "other" strike out "with".

Signed and sealed this 25th day of February 1964.

(SEAL)
Attest:

ERNEST W. SWIDER                           EDWIN L. REYNOLDS
Attesting Officer                              Acting Commissioner of Patents